United States Patent
Wu

(10) Patent No.: US 7,649,471 B2
(45) Date of Patent: Jan. 19, 2010

(54) LOGIC CIRCUIT AND METHOD FOR CONTROLLING DISPLAY LIGHTS OF HARD DISK

(75) Inventor: Chun-Yi Wu, Taipei (TW)

(73) Assignee: Inventec Corporation, Taipei (TW)

( * ) Notice: Subject to any disclaimer, the term of this patent is extended or adjusted under 35 U.S.C. 154(b) by 305 days.

(21) Appl. No.: 11/984,405

(22) Filed: Nov. 16, 2007

(65) Prior Publication Data

US 2009/0129228 A1 May 21, 2009

(51) Int. Cl.
*G08B 5/00* (2006.01)

(52) U.S. Cl. .................. 340/815.4; 702/182; 702/184; 700/293

(58) Field of Classification Search ................. 702/182, 702/184, 58; 700/293; 324/500–556
See application file for complete search history.

(56) References Cited

U.S. PATENT DOCUMENTS 5,623,274 A * 4/1997 Venkidu et al. ............... 345/34
6,919,816 B2 * 7/2005 Dearborn et al. ......... 340/815.45
2007/0075872 A1 * 4/2007 Zhang ..................... 340/815.4

* cited by examiner

*Primary Examiner*—George A Bugg
*Assistant Examiner*—Hongmin Fan
(74) *Attorney, Agent, or Firm*—CKC & Partners Co., Ltd.

(57) ABSTRACT

A logic circuit, for controlling display lights of a hard disk, includes a flip-flop, a logic gate and a buffer. The flip-flop receives a clock signal, a reset signal and a data signal and generates an output signal, in which the clock signal and the reset signal are obtained by a timing process of the data signal. The logic gate generates a logic signal according to the data signal and the output signal. The buffer receives the logic signal and an action signal. The logic signal enables the buffer such that the action signal passes through the buffer to drive a normal light during the normal operation of the hard disk, and the data signal drives a failure light during the failure or rebuilding operation of the hard disk. A method for controlling the display lights of the hard disk is also disclosed.

23 Claims, 4 Drawing Sheets

LOGIC CIRCUIT AND METHOD FOR CONTROLLING DISPLAY LIGHTS OF HARD DISK

BACKGROUND

1. Field of Invention

The present invention relates to a logic controlling circuit and method. More particularly, the present invention relates to a logic circuit and method for controlling display lights of a hard disk.

2. Description of Related Art

In general, when a user accesses data stored in a hard disk, a normal light is turned on during a normal operation of the hard disk, and a failure light is turned on during a failure or rebuilding operation of the hard disk. However, when the failure light is turned on, the normal light usually fails to stop accordingly; that is, during the failure or rebuilding operation of the hard disk, the normal light and the failure light may be turned on simultaneously, such that the user cannot distinguish between the hard disk operations at that moment and access the data on the hard disk efficiently.

For the foregoing reasons, there is a need to provide a control circuit for solving the problem of the normal light and the failure light being turned on simultaneously, so that the user may not be confused by the display light of the hard disk and the accessing operation may not be affected.

SUMMARY

In accordance with one embodiment of the present invention, a logic circuit for controlling display lights of a hard disk is provided. The logic circuit turns on only one display light during a normal operation of the hard disk, and turns on only another display light during a failure or rebuilding operation of the hard disk. The logic circuit includes a flip-flop, a logic gate and a buffer. The flip-flop is electrically coupled to the hard disk and receives a clock signal, a reset signal and a data signal representing a state of the hard disk. The flip-flop generates an output signal in accordance with the clock signal, the reset signal and the data signal, in which the clock signal and the reset signal are obtained by a timing processing of the data signal. The logic gate is electrically coupled to the flip-flop and generates a logic signal in accordance with the data signal and the output signal. The buffer is electrically coupled to the logic gate and receives the logic signal and an action signal representing the normal operation of the hard disk. The logic signal enables the buffer such that the action signal passes through the buffer to drive a normal light during the normal operation of the hard disk, and the data signal drives a failure light during the failure or rebuilding operation of the hard disk.

In accordance with another embodiment of the present invention, a method for controlling display lights of a hard disk is provided. The method is used to turn on only one display light during a normal operation of the hard disk and to turn on only another display light during a failure or rebuilding operation of the hard disk. The method includes the steps of generating an output signal in accordance with a clock signal, a reset signal and a data signal representing a state of the hard disk; processing the output signal and the data signal by a logic operation to obtain a logic signal; determining a level of the logic signal; and driving a normal light or a failure light which represents the normal operation of the hard disk or the failure or rebuilding operation of the hard disk in accordance with the level of the logic signal.

For the foregoing embodiments of the present invention, the logic circuit and method, for controlling the display lights of the hard disk, can prevent users from being confused by the display lights of the hard disk, such that the users can clearly distinguish the display lights of the hard disk to understand the state of the hard disk.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Figure 1:
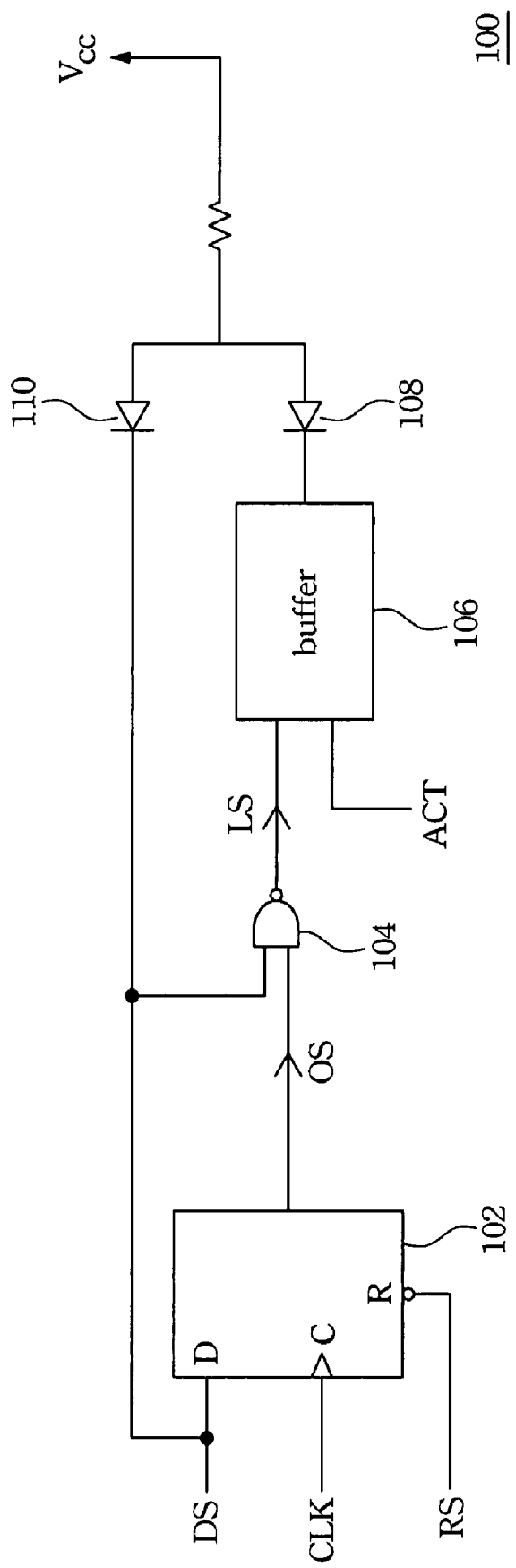
FIG. 1 shows a logic circuit according to one embodiment of the present invention.

FIG. 1 shows a logic circuit according to one embodiment of the present invention. The logic circuit controls display lights of a hard disk, and turns on only one display light during a normal operation of the hard disk and turns on only another display light during a failure or rebuilding operation of the hard disk. The logic circuit 100 includes a flip-flop, a logic gate and a buffer 106, in which 10 the flip-flop can be a D flip-flop 102, and the logic gate can be a NAND gate 104. The D flip-flop 102 is electrically coupled to the hard disk (not shown), and receives a clock signal CLK, a reset signal RS and a data signal DS through a clock signal input terminal C, a reset signal input terminal R and a data signal input terminal D thereof, respectively. The D flip-flop 102 generates an output signal OS from an output terminal in accordance with the clock signal CLK, the reset signal RS and the data signal DS. The clock signal CLK and the reset signal RS are obtained by a timing process of the data signal DS, and the D flip-flop 102 is a positive-edge-triggered D flip-flop.

Furthermore, the data signal DS represents an operation state of the hard disk at the moment, and the clock signal CLK and the reset signal RS are respectively obtained by delaying the data signal DS. Wherein, the data signal DS is at a high level during the normal operation of the hard disk, the data signal DS is at a low level during the failure operation of the hard disk, and the data signal DS is a square-wave signal during the rebuilding operation of the hard disk.

The NAND gate 104 has two input terminals and one output terminal. The two input terminals of the NAND gate 104 are electrically coupled to the D flip-flop 102 and receive the data signal DS and the output signal OS respectively to generate a logic signal LS in accordance with the data signal DS and the output signal OS. The NAND gate 104 then outputs the logic signal LS through the output terminal.

The buffer 106 is electrically coupled to the output terminal of the NAND gate 104 and receives the logic signal LS output from the NAND gate 104. Besides, the buffer 106 is further electrically coupled to the hard disk and 10 receives an action signal ACT representing the normal operation of the hard disk. During the normal operation of the hard disk, the logic signal LS enables the buffer 106 such that the action signal ACT passes through the buffer 106 to drive a normal light, such as a blue LED 108. On the other hand, during the failure or rebuilding operation of the hard disk, the data signal DS drives a failure light, such as a red LED 110.

Figure 2:
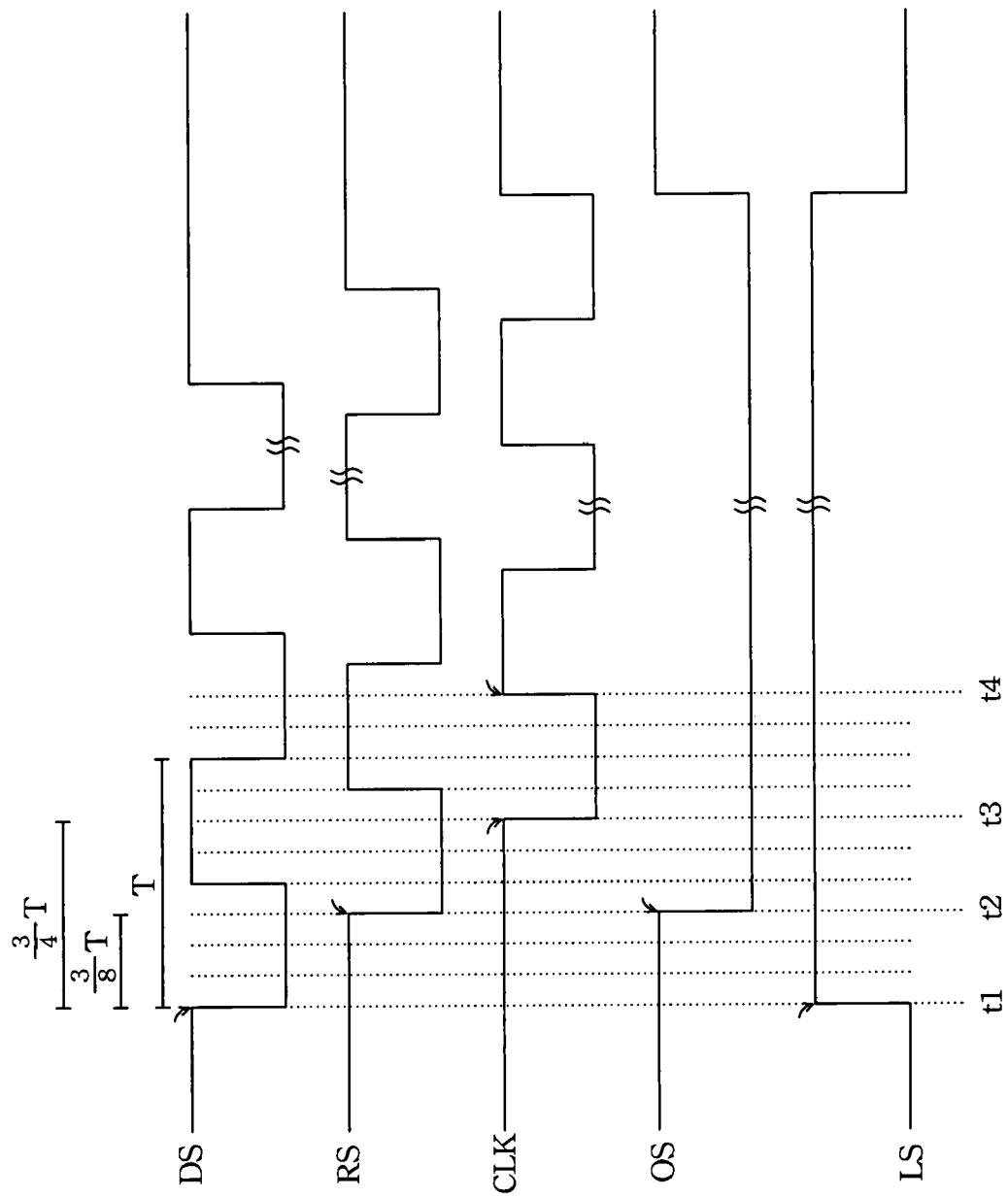
FIG. 2 shows a timing diagram of the logic circuit shown in FIG. 1 during the rebuilding operation of the hard disk.

FIG. 2 shows a timing diagram of the logic circuit shown in FIG. 1 during the rebuilding operation of the hard disk. During the rebuilding operation of the hard disk, the data signal DS is a square-wave signal with a time period T. The reset signal RS is obtained by delaying the square-wave signal for ¼ to ¾ time periods during the timing processing of the data signal DS. The clock signal CLK is obtained by delaying the square-wave signal for (N+0.75) time periods during the timing processing of the data signal DS, in which N is a positive integer.

In the present embodiment, the reset signal RS is obtained by delaying the data signal DS for ⅜ time periods, and the clock signal CLK is obtained by delaying the data signal DS for ¾ time periods. Moreover, the D flip-flop 102 is the positive-edge-triggered D flip-flop, so when the clock signal CLK switches from a low level to a high level and the reset signal RS is at a high level, the D flip-flop 102 acquires the data signal DS to be the output signal OS.

An embodiment is described as following to explain the operation of the logic circuit 100 during the rebuilding operation of the hard disk. Refer to FIG. 1 and FIG. 2. At the time interval t1, the data signal DS switches from the high level to the low level. The clock signal CLK and the reset signal RS do not change. The output signal OS therefore remains at the high level. Then, after the NAND gate 104 processes the output signal OS and the data signal DS, the logic signal LS generated by the NAND gate 104 switches from the low level to the high level.

At the time interval t2, the data signal DS is at the low level, and the reset signal RS switches from the high level to the low level, and the clock signal CLK does not change, so the output signal OS switches from the high level to the low level along with the reset signal RS. The logic signal LS generated by the NAND gate 104 remains at the high level at the moment.

At the time interval t3, the data signal DS is at the high level, and the reset signal RS is at the low level. The clock signal CLK switches from the high level to the low level. Because the D flip-flop 102 is the positive-edge-triggered D flip-flop, the output signal OS remains at the low level and the logic signal LS is thus at the high level.

At the time interval t4, the data signal DS is at the low level, and the reset signal RS is at the high level. The clock signal CLK switches from the low level to the high level, so the D flip-flop 102 acquires the data signal DS to be the output signal OS. At the moment, the output signal OS and the data signal DS are both at the low level, such that the logic signal LS remains at the high level. In the present embodiment, the logic signal LS is maintained at the high level during the rebuilding operation of the hard disk, so the action signal ACT cannot pass through the buffer 106 to drive the blue LED 108, but drives the red LED 110 directly by the data signal DS.

Figure 3:
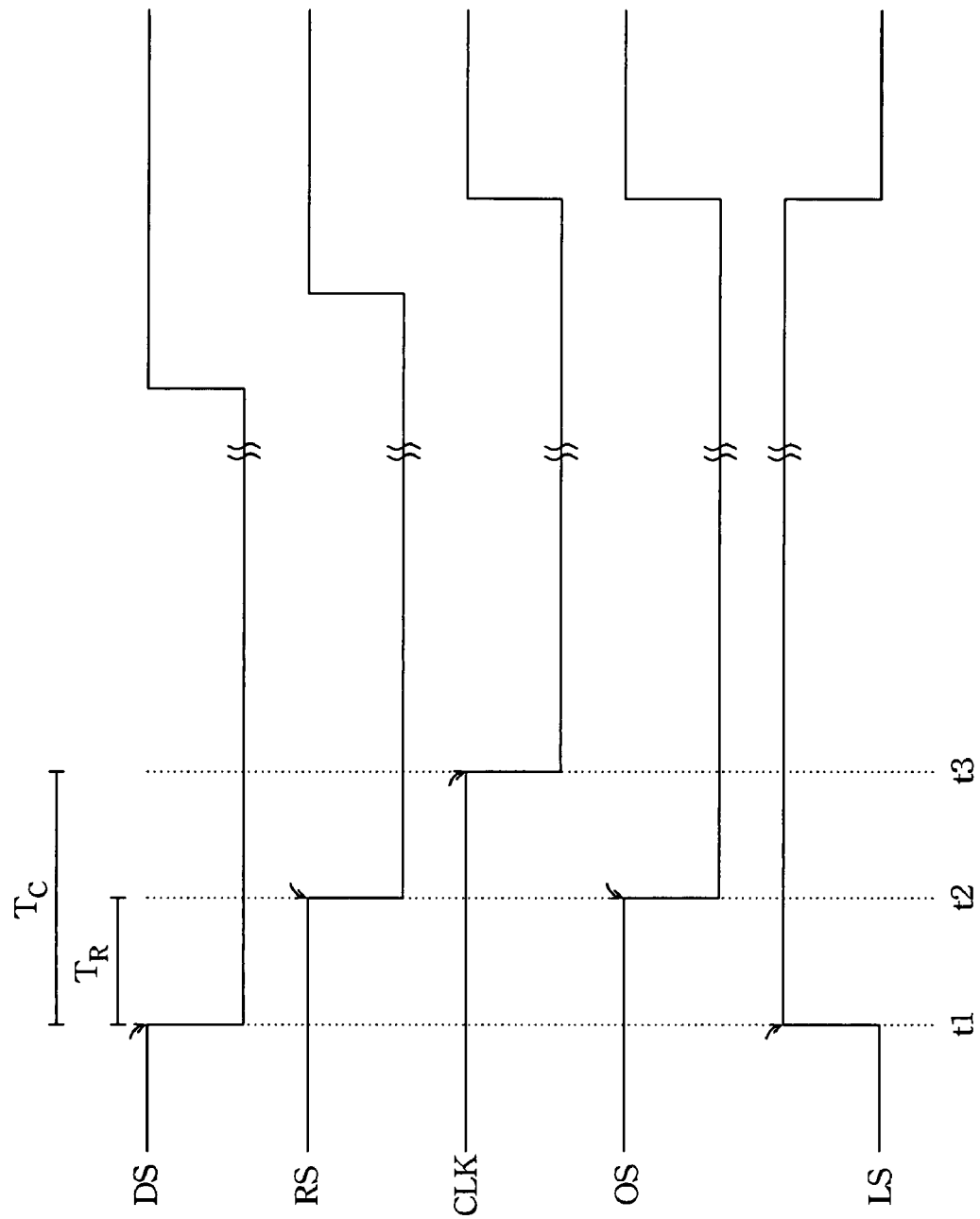
FIG. 3 shows a timing diagram of the logic circuit shown in FIG. 1 during the failure operation of the hard disk.

FIG. 3 shows a timing diagram of the logic circuit shown in FIG. 1 during the failure operation of the hard disk. During the failure operation of the hard disk, the data signal DS is at the low level, and the reset signal RS is obtained by delaying the data signal DS for a time interval $T_R$, and the clock signal CLK is obtained by delaying the data signal DS for a time interval $T_C$, in which the time interval $T_C$ is larger than the time interval $T_R$.

An embodiment is described as following to explain the operation of the logic circuit 100 during the failure operation of the hard disk. Refer to FIG. 1 and FIG. 3. At the time interval t1, the data signal DS switches from the high level to the low level, and the clock signal CLK and the reset signal RS do not change, so the output signal OS remains at the high level. Then, after the NAND gate 104 processes the output signal OS and the data signal DS, the logic signal LS generated by the NAND gate 104 switches from the low level to the high level.

At the time interval t2, the data signal DS is at the low level, and the reset signal RS switches from the high level to the low level, and the clock signal CLK does not change, so the output signal OS switches from the high level to the low level along with the reset signal RS. The logic signal LS generated by the NAND gate 104 remains at the high level at the moment.

At the time interval t3, the data signal DS and the reset signal RS are both at the low level, and the clock signal CLK switches from the high level to the low level. Because the D flip-flop 102 is the positive-edge-triggered D flip-flop, the output signal OS remains at the low level and the logic signal LS is thus at the high level. In the present embodiment, the logic signal LS is maintained at the high level during the failure operation of the hard disk, so the action signal ACT cannot pass through the buffer 106 to drive the blue LED 108, but drives the red LED 110 directly by the data signal DS.

Referring to FIG. 1, during the normal operation of the hard disk, the data signal DS is maintained at the high level, so the output signal OS is kept at the high level. After the NAND gate 104 processes the output signal OS and the data signal DS, the logic signal LS generated by the NAND gate 104 is at the low level. Therefore, the buffer 106 can be enabled by the logic signal LS at the moment, such that the action signal ACT passes through the buffer 106 to drive the blue LED 108. Furthermore, because the data signal DS is at the high level, the red LED 110 does not work.

Figure 4:
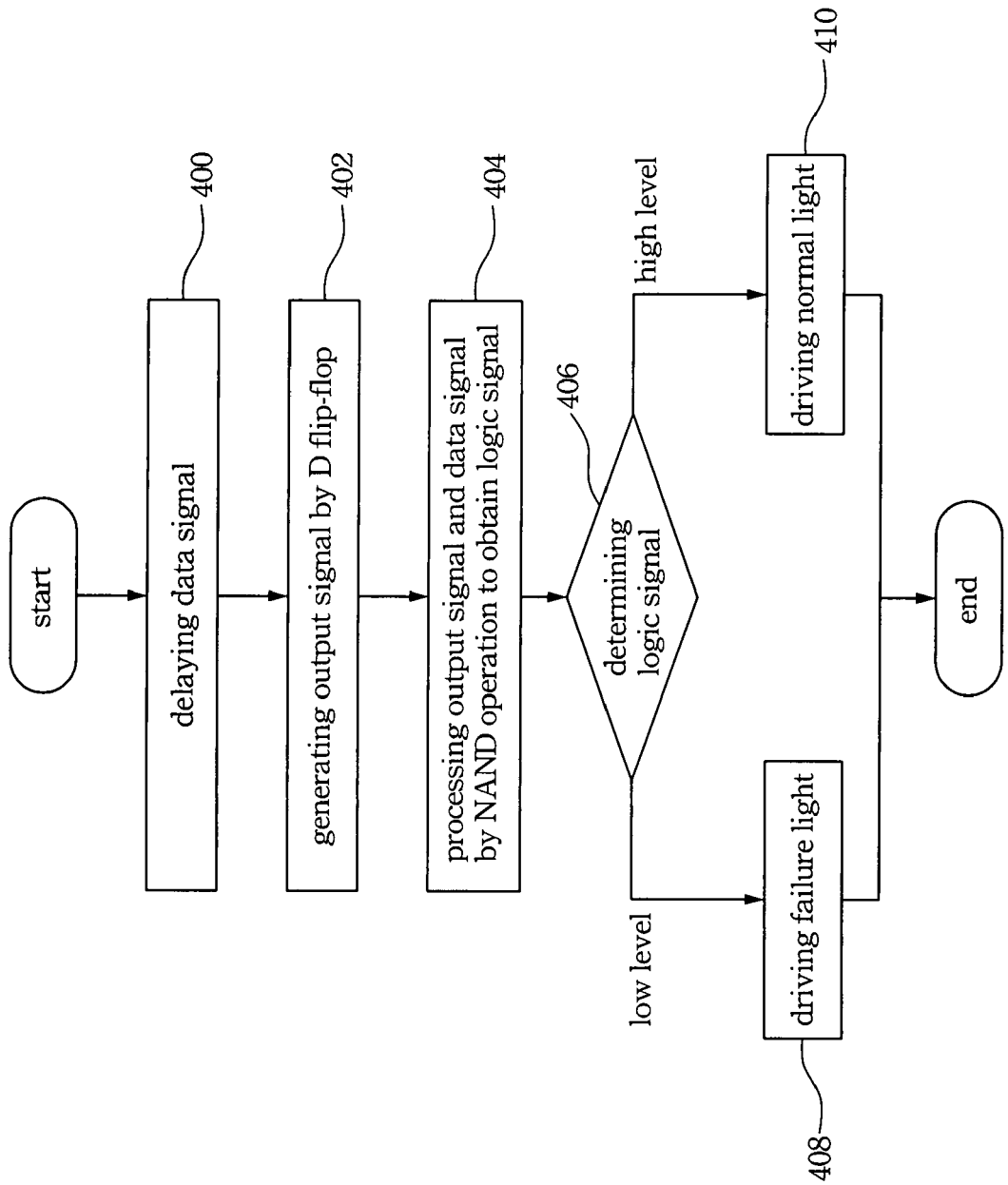
FIG. 4 shows a flow chart of a method for controlling display lights of a hard disk.

FIG. 4 shows a flow chart of a method for controlling display lights of a hard disk. The method is used to turn on only one display light during a normal operation of the hard disk and to turn on only another display light during a failure or rebuilding operation of the hard disk. Refer to FIG. 1 and FIG. 4. First, the data signal DS, which represents a state of the hard disk, is delayed (Step 400) so as to obtain the clock signal CLK and the reset signal RS respectively. Then, the output signal OS is generated by the positive-edge-triggered D flip-flop 102 in accordance with the clock signal CLK, the reset signal RS and the data signal DS (Step 402). Next, the output signal OS and the data signal DS are processed by NAND operation to obtain the logic signal LS (Step 404). After that, the level of the logic signal LS which is obtained after the logic operation is determined (Step 406). At last, the normal light or the failure light is driven, in accordance with the level of the logic signal LS, to represent the normal operation of the hard disk, or the failure or rebuilding operation of the hard disk. In the present embodiment, when the logic signal LS is kept at the low level, the failure light is driven (Step 408); when the logic signal LS is kept at the high level, the normal light is driven (Step 410).

Moreover, during the normal operation of the hard disk, the logic signal LS, which is obtained by the NAND operation of the output signal OS and the data signal DS, is at the low level in accordance with the clock signal CLK, the reset signal RS and the data signal DS. During the failure or rebuilding operation of the hard disk, the logic signal, which is obtained by the NAND operation of the output signal OS and the data signal DS, is at the high level in accordance with the clock signal CLK, the reset signal RS and the data signal DS.

During the rebuilding operation of the hard disk, the data signal DS is a square-wave signal with a time period T. The reset signal RS is thus obtained by delaying the square-wave signal for ¼ to ¾ time periods, and the clock signal CLK is thus obtained by delaying the square-wave signal for (N+0.75) time periods, such that the logic signal LS is kept at the high level during the rebuilding operation of the hard disk, in which N is a positive integer.

For the foregoing embodiments of the present invention, the logic circuit and method, for controlling the display lights of the hard disk, can prevent users from being confused by the display lights of the hard disk, such that the users can clearly distinguish the display lights of the hard disk to understand the state of the hard disk and access the data conveniently.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A logic circuit for controlling display lights of a hard disk, the logic circuit turning on only one display light during a normal operation of the hard disk and turning on only another display light during a failure or rebuilding operation of the hard disk, the logic circuit comprising:
    a flip-flop electrically coupled to the hard disk and receiving a clock signal, a reset signal and a data signal representing a state of the hard disk, the flip-flop generating an output signal in accordance with the clock signal, the reset signal and the data signal, wherein the clock signal and the reset signal are obtained by a timing process of the data signal;
    a logic gate electrically coupled to the flip-flop and generating a logic signal in accordance with the data signal and the output signal; and
    a buffer electrically coupled to the logic gate and receiving the logic signal and an action signal representing the normal operation of the hard disk;
    wherein the logic signal enables the buffer such that the action signal passes through the buffer to drive a normal light during the normal operation of the hard disk, and the data signal drives a failure light during the failure or rebuilding operation of the hard disk.

2. The logic circuit as claimed in claim 1, wherein the clock signal and the reset signal are respectively obtained by delaying the data signal.

3. The logic circuit as claimed in claim 2, wherein during the normal operation of the hard disk, the logic signal generated by the logic gate is at a low level in accordance with the clock signal, the reset signal and the data signal.

4. The logic circuit as claimed in claim 2, wherein during the failure or rebuilding operation of the hard disk, the logic signal generated by the logic gate is at a high level in accordance with the clock signal, the reset signal and the data signal.

5. The logic circuit as claimed in claim 4, wherein during the rebuilding operation of the hard disk, the data signal is a square-wave signal.

6. The logic circuit as claimed in claim 5, wherein during the timing processing of the data signal, the clock signal is obtained by delaying the square-wave signal for (N+0.75) periods, wherein N is a positive integer.

7. The logic circuit as claimed in claim 5, wherein during the timing processing of the data signal, the reset signal is obtained by delaying the square-wave signal for ¼ to ¾ periods.

8. The logic circuit as claimed in claim 1, wherein during the normal operation of the hard disk, the data signal is at a high level.

9. The logic circuit as claimed in claim 1, wherein during the failure operation of the hard disk, the data signal is at a low level.

10. The logic circuit as claimed in claim 1, wherein the flip-flop is a positive-edge-triggered D flip-flop.

11. The logic circuit as claimed in claim 1, wherein the logic gate is a NAND gate.

12. A method for controlling display lights of a hard disk, the method being used to turn on only one display light during a normal operation of the hard disk and to turn on only another display light during a failure or rebuilding operation of the hard disk, the method comprising:
    generating an output signal in accordance with a clock signal, a reset signal and a data signal representing a state of the hard disk;
    processing the output signal and the data signal by a logic operation to obtain a logic signal;
    determining a level of the logic signal; and
    driving a normal light or a failure light which represents the normal operation of the hard disk or the failure or rebuilding operation of the hard disk in accordance with the level of the logic signal.

13. The method as claimed in claim 12, further comprising:
    delaying the data signal to obtain the clock signal and the reset signal respectively.

14. The method as claimed in claim 13, wherein during the normal operation of the hard disk, the logic signal obtained by processing logically the output signal and the data signal is at a low level in accordance with the clock signal, the reset signal and the data signal.

15. The method as claimed in claim 14, wherein the step of driving the normal light or the failure light further comprises:
    driving the normal light when the logic signal is at the low level.

16. The method as claimed in claim 13, wherein during the failure or rebuilding operation of the hard disk, the logic signal obtained by processing logically the output signal and the data signal is at a high level in accordance with the clock signal, the reset signal and the data signal.

17. The method as claimed in claim 16, wherein the step of driving the normal light or the failure light further comprises:
    driving the failure light when the logic signal is at the high level.

18. The method as claimed in claim 16, wherein during the rebuilding operation of the hard disk, the data signal is a square-wave signal.

19. The method as claimed in claim 18, further comprising:
    delaying the square-wave signal for (N+0.75) periods to obtain the clock signal, wherein N is a positive integer.

20. The method as claimed in claim 18, further comprising:
    delaying the square-wave signal for ¼ to ¾ periods to obtain the reset signal.

21. The method as claimed in claim 12, wherein the output signal and the data signal are processed by a NAND operation.

22. The method as claimed in claim 12, wherein during the normal operation of the hard disk, the data signal is at a high level.

23. The method as claimed in claim 12, wherein during the failure operation of the hard disk, the data signal is at a low level.

* * * * *